(12) United States Patent
Hirata et al.

(10) Patent No.: US 10,849,802 B2
(45) Date of Patent: Dec. 1, 2020

(54) CONNECTOR STRUCTURE

(71) Applicant: WHILL, Inc., Tokyo (JP)

(72) Inventors: Yoshihiro Hirata, Kanagawa (JP); Toyotaka Kozuki, Kanagawa (JP)

(73) Assignee: WHILL, INC., Tokyo (JP)

( * ) Notice: Subject to any disclaimer, the term of this patent is extended or adjusted under 35 U.S.C. 154(b) by 0 days.

(21) Appl. No.: 16/567,467

(22) Filed: Sep. 11, 2019

(65) Prior Publication Data

US 2020/0000656 A1 Jan. 2, 2020

Related U.S. Application Data

(63) Continuation of application No. PCT/JP2018/010389, filed on Mar. 16, 2018.

(30) Foreign Application Priority Data

Mar. 16, 2017 (JP) ................................ 2017-051781

(51) Int. Cl.
*A61G 5/04* (2013.01)
*B60N 2/90* (2018.01)
(Continued)

(52) U.S. Cl.
CPC .................. *A61G 5/04* (2013.01); *A61G 5/10* (2013.01); *B60L 50/50* (2019.02); *B60N 2/90* (2018.02);
(Continued)

(58) Field of Classification Search
CPC ......... A61G 5/04; A61G 5/10; B60L 2200/24; B60L 2200/34; H01R 13/631; H01R 13/639
See application file for complete search history.

(56) References Cited

U.S. PATENT DOCUMENTS 5,421,598 A * 6/1995 Robertson ................ A61G 5/00
280/250.1
5,873,737 A 2/1999 Hashizawa et al.
(Continued)

FOREIGN PATENT DOCUMENTS

CN 103037825 4/2013
CN 203558160 4/2014
(Continued)

OTHER PUBLICATIONS

International Search Report with partial translation for application No. PCT/JP2018/010389 , dated Jun. 19, 2018.
(Continued)

*Primary Examiner* — Jacob D Knutson
*Assistant Examiner* — Michael R Stabley
(74) *Attorney, Agent, or Firm* — BainwoodHuang (57) ABSTRACT

A connector structure in an electric mobility device including a mobility body driven by a motor, a seat unit which includes an operation unit to control the motor and which is detachably attached to a seat attachment member of the mobility body, and a seat height adjustment mechanism which adjusts a height position of the seat attachment member to adjust a height position of the seat unit relative to the mobility body. The connector structure connects a signal line provided in the seat unit to a signal line of the mobility body, and includes a first connector attached to the seat unit and connected to the signal line which is connected to the operation unit, and a second connector attached to the seat attachment member and connected to the signal line of the mobility body.

9 Claims, 7 Drawing Sheets

(51) Int. Cl.
*B60L 50/50* (2019.01)
*A61G 5/10* (2006.01)
*H01R 13/631* (2006.01)
*H01R 13/639* (2006.01)
*B62K 5/007* (2013.01)

(52) U.S. Cl.
CPC ......... *H01R 13/631* (2013.01); *H01R 13/639* (2013.01); *B60L 2200/24* (2013.01); *B60L 2200/34* (2013.01); *B62K 5/007* (2013.01)

(56) References Cited

U.S. PATENT DOCUMENTS

| | | | | |
|---|---|---|---|---|
| 5,921,338 | A * | 7/1999 | Edmondson | B60G 21/045 180/65.51 |
| 6,220,382 | B1 * | 4/2001 | Kramer, Jr. | A61G 5/043 180/65.51 |
| 6,405,816 | B1 | 6/2002 | Kamen et al. | |
| D642,499 | S | 8/2011 | Tuckowski et al. | |
| D642,500 | S | 8/2011 | Tuckowski et al. | |
| D654,408 | S | 2/2012 | Spalding et al. | |
| D656,070 | S | 3/2012 | Spalding et al. | |
| 8,336,904 | B2 * | 12/2012 | Kylstra | A61G 5/045 280/287 |
| D720,659 | S | 1/2015 | Tuckowski et al. | |
| D720,663 | S | 1/2015 | Spalding et al. | |
| D721,017 | S | 1/2015 | Spalding et al. | |
| 9,173,792 | B2 * | 11/2015 | Goffer | A61G 5/12 |
| 9,700,472 | B2 * | 7/2017 | Gierse | A61G 5/1059 |
| 2002/0023787 | A1 | 2/2002 | Kamen et al. | |
| 2004/0183272 | A1 | 9/2004 | Kamen et al. | |
| 2007/0051543 | A1 | 3/2007 | Kamen et al. | |
| 2009/0078482 | A1 | 3/2009 | Kylstra | |
| 2011/0227314 | A1 | 9/2011 | Lowenthal et al. | |
| 2011/0316253 | A1 | 12/2011 | Tuckowski et al. | |
| 2012/0018234 | A1 | 1/2012 | Pandya et al. | |
| 2013/0278031 | A1 | 10/2013 | Kostin et al. | |
| 2014/0273588 | A1 | 9/2014 | Toratani et al. | |
| 2015/0027824 | A1 | 1/2015 | Pandya et al. | |
| 2015/0075882 | A1 | 3/2015 | Tuckowski et al. | |
| 2015/0157518 | A1 | 6/2015 | Loewenthal et al. | |

FOREIGN PATENT DOCUMENTS

| | | |
|---|---|---|
| CN | 103907245 | 7/2014 |
| EP | 2894726 | 7/2015 |
| GB | 2450348 | 12/2008 |
| GB | 2450348 B | 10/2009 |
| JP | H09-572 | 1/1997 |
| JP | H09-223534 | 8/1997 |
| JP | 2001191823 | 7/2001 |
| JP | 2003501146 | 1/2003 |
| JP | 2008278644 | 11/2008 |
| JP | 5779658 | 9/2015 |
| WO | 200074623 | 12/2000 |
| WO | 2009039503 | 3/2009 |
| WO | 2011163571 | 12/2011 |

OTHER PUBLICATIONS

Chinese National Intellectual Property Administration (CNIPA)—Evaluation Report of Utility Model Patent Right, Patent No. zL2018900001877, dated Jan. 21, 2020.

Chinese National Intellectual Property Administration (CNIPA)—Evaluation Report of Utility Model Patent Right, Patent No. zL2018900001877, dated Jul. 29, 2020.

* cited by examiner

CONNECTOR STRUCTURE

CROSS-REFERENCE TO RELATED APPLICATIONS

This application is based on and claims priority to Japanese Patent Application No. 2017-051781 filed on Mar. 16, 2017, the entire content of which is incorporated herein by reference. This application is based on International Patent Application No. PCT/JP2018/010389 filed on Mar. 16, 2018, the entire content of which is incorporated herein by reference.

BACKGROUND

The present invention relates to a connector structure of an electric mobility device.

A conventionally known automobile (refer to PTL 1, for example) on which a wheelchair is mounted as a seat includes an elevation mechanism provided to the automobile to move up and down the wheelchair, a first connector provided on a lower surface of a rear end part of the seat of the wheelchair, and a second connector provided on an upper surface of a support frame supporting the seat of the wheelchair in the elevation mechanism. The first connector and the second connector are connected with each other when the seat of the wheelchair is supported by the support frame of the elevation mechanism to mount the wheelchair on the automobile.

CITATION LIST

{PTL 1}

Japanese Unexamined Patent Application, Publication No. 2001-191823

SUMMARY OF INVENTION

A first aspect of the present invention is a connector structure in an electric mobility device including: a mobility body provided with a plurality of wheels and a motor to drive at least one of the plurality of wheels; a seat unit detachably attached to a seat attachment member of the mobility body and provided with an operation unit to control driving of the motor; and a seat height adjustment mechanism which adjusts a height position of the seat attachment member relative to the mobility body, wherein the connector structure is for connecting a signal line of the mobility body to a signal line which is provided in the seat unit and which is connected to the operation unit, the connector structure comprising: a first connector attached to the seat unit and connected to the signal line which is connected to the operation unit; and a second connector which is attached to the seat attachment member so that the second connector exists outside the seat attachment member and which is connected to the signal line of the mobility body, wherein the second connector is attached to the seat attachment member such that, when the seat unit is attached to the seat attachment member, the second connector is positioned below the first connector where the second connector can be connected with the first connector.

DETAILED DESCRIPTION

The following describes an electric mobility device according to an embodiment of the present invention with reference to the accompanying drawings.

Figure 1:
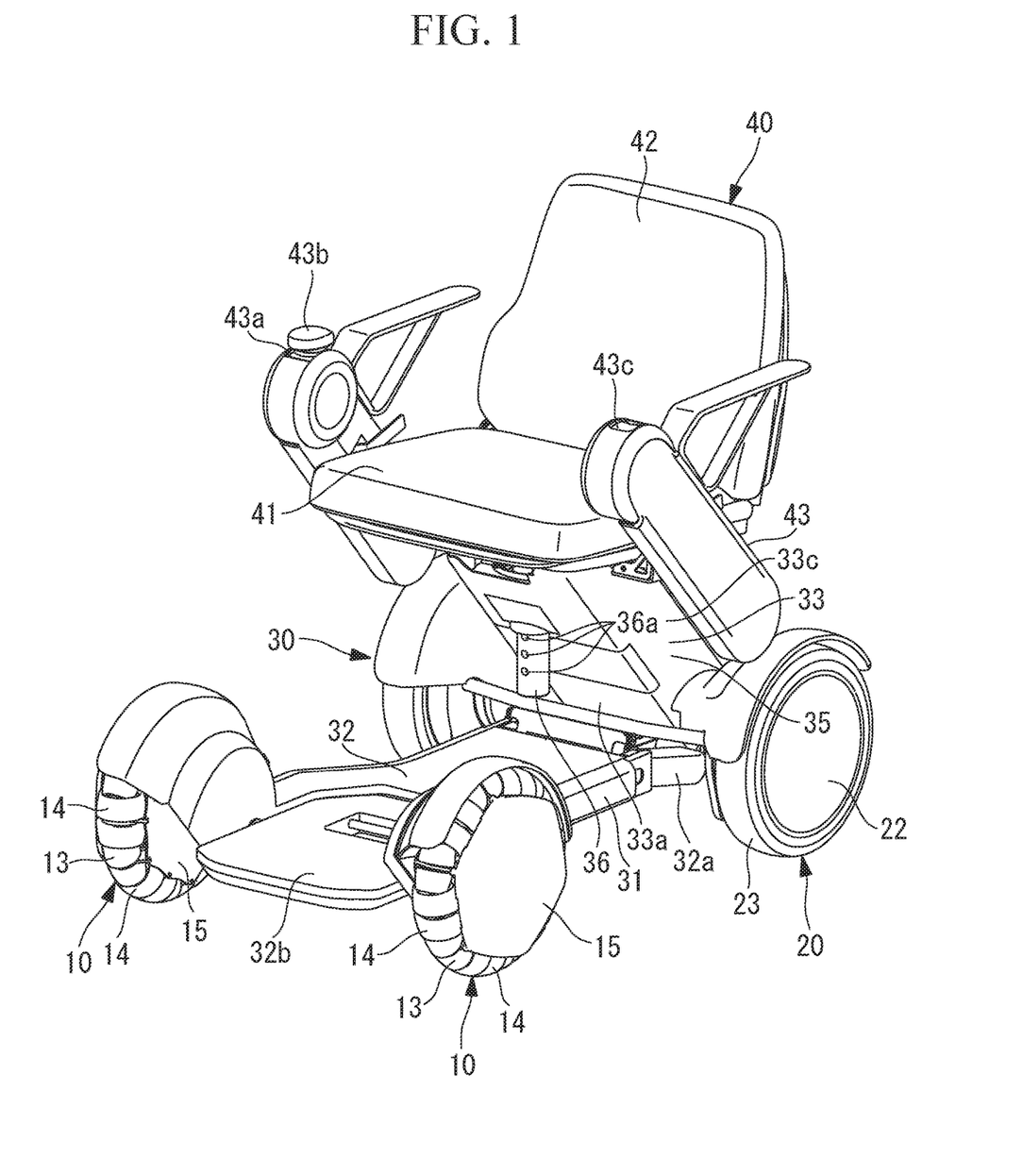
FIG. 1 is a front perspective view of an electric mobility device according to an embodiment of the present invention.
Figure 2:
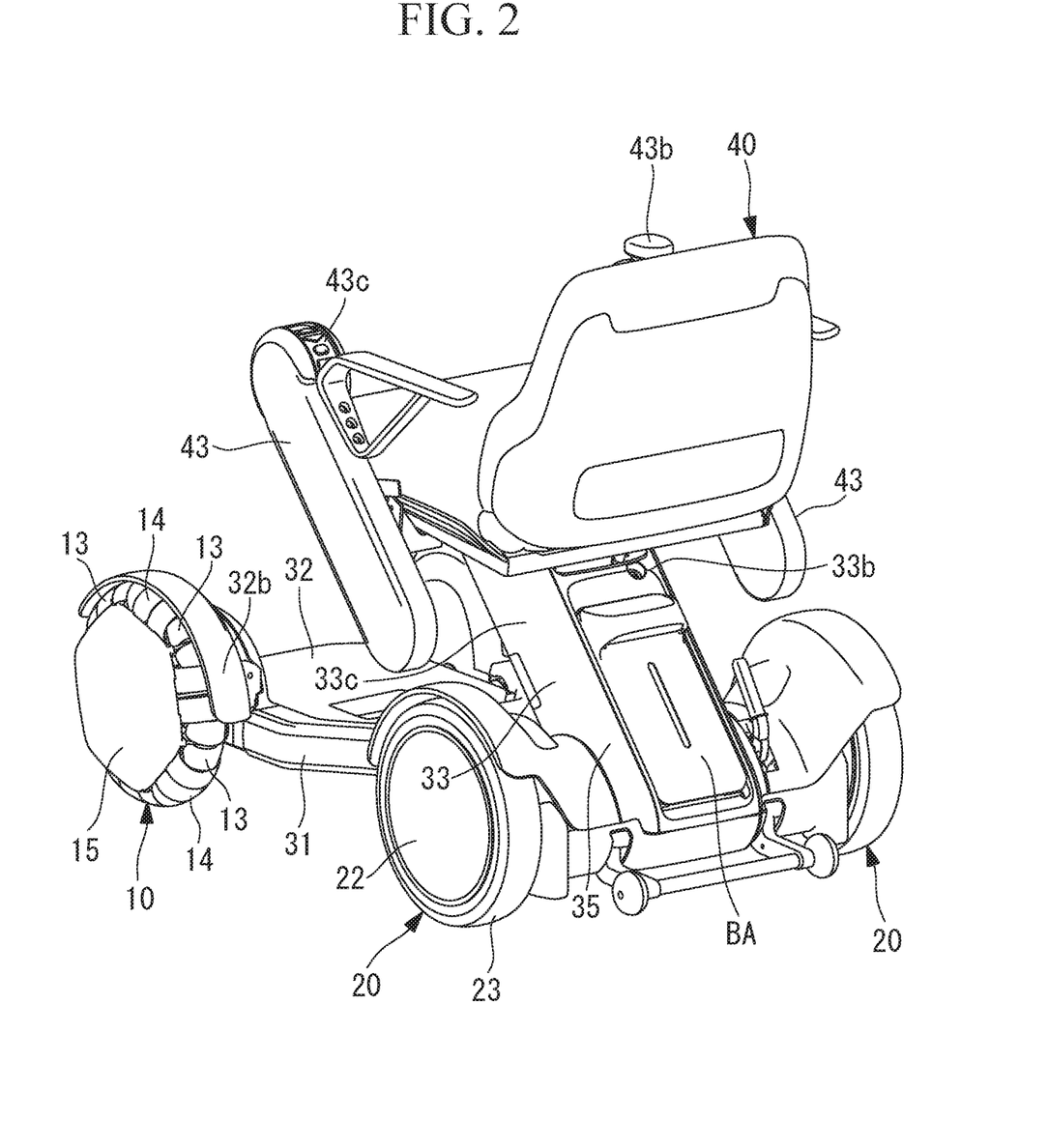
FIG. 2 is a rear perspective view of the electric mobility device according to the present embodiment.

As illustrated in FIGS. 1 and 2, the electric mobility device includes a mobility body 30, and the mobility body 30 includes a pair of front wheels 10, a pair of rear wheels 20, and a body 31 supported by the front wheels 10 and the rear wheels 20. The electric mobility device also includes a seat unit 40 detachably attached to the mobility body 30, and a motor 50 (see FIG. 4) attached to the mobility body 30 and configured to drive at least one of the pair of front wheels 10 and the pair of rear wheels 20. In the following description, the vehicle front-back direction may be referred to as a front-back direction, and the vehicle width direction may be referred to as a width direction.

In the present embodiment, the pair of rear wheels 20 are each connected with the motor 50 and can be driven by the respective motors 50. Drive power of the motor 50 may be transferred to the pair of front wheels 10 through a power transfer means such as a belt or a gear.

Each front wheel 10 is supported by the body 31 through a wheel shaft, a suspension, and the like (not illustrated). Each front wheel 10 has a contact surface formed by a plurality of rollers 13 and 14 arranged in the circumferential direction thereof. The outer shape of each roller 13 is smaller than the outer shape of each roller 14, and the rollers 13 and 14 are alternately arranged in the circumferential direction.

More specifically, each front wheel 10 includes a hub 15 attached to the wheel shaft, and a plurality of roller support shafts arranged in the circumferential direction of the hub 15 and each supported by the hub 15. The plurality of rollers 13 and 14 are rotatably supported by the roller support shaft. The hub 15 may be directly attached to the wheel shaft through a bearing or the like or through a buffering member or another intermediate member.

With this configuration, the rollers 13 and 14 can be each rotated about an axis line extending in a direction intersecting with the radial direction of the wheel shaft, and the front wheel 10 is an omnidirectional wheel that moves in all directions relative to the contact surface.

In the present embodiment, each rear wheel 20 includes a wheel shaft (may be the main shaft of the motor 50), a hub 22 attached to the wheel shaft, and a circumferential member 23 provided on the circumferential side of the hub 22 and having a circumference surface formed of a material having rubber elasticity, but may be an omnidirectional wheel like the front wheels 10. The front wheels 10 may be wheels same as the rear wheels 10. In addition, the front wheels 10 may be wheels same as the rear wheels 20, and a means for changing the steering angle of the front wheels 10 and/or the rear wheels 20 may be provided.

The body 31 includes a base part 32 extending along the ground, and a seat support part 33 that extends upward from the rear end side of the base part 32 and that extends obliquely toward the vehicle front side, and to the upper end side of which the seat unit 40 is attached.

The base part 32 includes a metal base frame 32a that supports suspension of the front wheels 10 and the motors 50 of the rear wheels 20, and a plastic base cover 32b at least partially covering the base frame 32a and utilized as a portion on which the feet of a passenger seated on the seat unit 40 are placed, a baggage placement portion, and the like.

Figure 3:
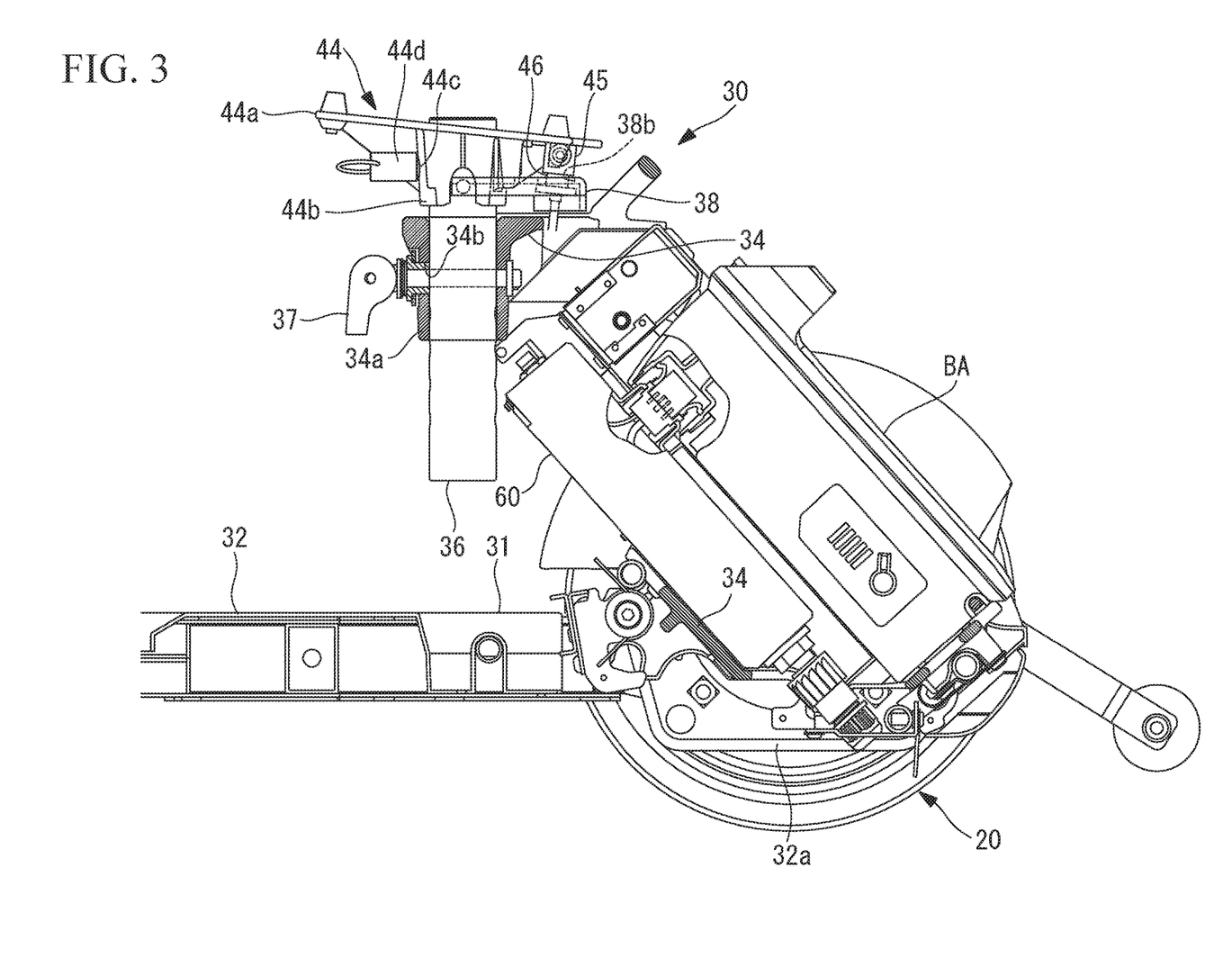
FIG. 3 is a main part cross-sectional view of the electric mobility device according to the present embodiment.

The seat support part 33 includes a support part frame 34 supported or fixed to the rear end side of the base frame 32a and extending diagonally upward, and a plastic support part cover 35 covering the support part frame 34. As illustrated in FIG. 3, a seat attachment member 36 is attached to the upper end side of the support part frame 34.

The seat attachment member 36 is long in the up-down direction and is provided with a plurality of positioning holes 36a at intervals in the up-down direction. Each positioning hole 36a penetrates through the seat attachment member 36 in a direction orthogonal to the longitudinal direction thereof. A tubular part 34a into which the seat attachment member 36 is inserted in the up-down direction is provided at the upper end side of the support part frame 34. The tubular part 34a is provided with a support-part side hole 34b penetrating in the front-back direction of the electric mobility device. The inner shape of the tubular part 34a is slightly larger than the outer shape of the seat attachment member 36.

The seat attachment member 36 is attached to the mobility body 30 by inserting the seat attachment member 36 into the tubular part 34a, positioning any of the positioning holes 36a to the support-part side hole 34b, and inserting a positioning member 37 into the support-part side hole 34b and the positioning holes 36a to attach the positioning member 37 to the tubular part 34a. In addition, the height position of the seat attachment member 36 relative to the mobility body 30 can be adjusted by inserting the positioning member 37 into a different positioning hole 36a. Since the height position of the seat unit 40 is adjusted by adjusting the height position of the seat attachment member 36, the tubular part 34a, the support-part side hole 34b, the plurality of positioning holes 36a, and the positioning member 37 function as a seat height adjustment mechanism.

As illustrated in FIGS. 1 and 2, the seat support part 33 includes a front surface 33a, a back surface 33b, and a pair of side surfaces 33c disposed between the front surface 33a and the back surface 33b. As illustrated in FIGS. 2 and 3, a rechargeable battery BA is detachably attached to the seat support part 33. In addition, as illustrated in FIG. 3, a control unit 60 described later is disposed in the seat support part 33.

The seat unit 40 includes a seating surface part 41 on which a passenger is seated, a backrest part 42, a pair of control arms 43 arranged in the vehicle width direction, and a seating surface frame 44 fixed to the lower surface of the seating surface part 41 and detachably attached to the seat attachment member 36 of the seat support part 33. The seating surface frame 44 is provided with a plate part 44a extending along the lower surface of the seating surface part 41, and a tubular part 44b extending downward from the central side of the plate part 44a. The tubular part 44b is provided with a seat side hole 44c penetrating in the front-back direction of the electric mobility device.

The seat attachment member 36 is provided with a seat attachment hole or a slit 36b at a position higher than the plurality of positioning holes 36a. The seat attachment hole or the seat attachment slit 36b penetrates through the seat attachment member 36 in the direction orthogonal to the longitudinal direction thereof. The inner shape of the tubular part 44b is slightly larger than the outer shape of the seat attachment member 36.

A seat member 40 is attached to the mobility body 30 by inserting the upper end side of the seat attachment member 36 into the tubular part 44b, positioning the seat side hole 44c to the seat attachment slit 36b, and inserting an attachment member 44d into the seat side hole 44c and the seat attachment slit 36b to attach the attachment member 44d to the tubular part 44a.

An operation unit 43a including an operation lever 43b is provided on the upper end of the control arm 43 on the right side. The operation lever 43b is disposed at a neutral position by an urging member (not illustrated) disposed in the operation unit 43a when no force is applied. The operation lever 43b can be displaced rightward, leftward, forward, and backward relative to the neutral position by the passenger with the right hand.

Signals in accordance with the direction and amount of displacement of the operation lever 43b are transmitted from the operation unit 43a to the control unit 60 described later. Each motor 50 is driven in accordance with the signal. For example, when the operation lever 43b is displaced forward relative to the neutral position, a signal for rotating each motor 50 toward the vehicle front side is transmitted, and the electric mobility device travels forward at a speed in accordance with the amount of displacement of the operation lever 43b. When the operation lever 43b is displaced obliquely forward left relative to the neutral position, a signal for rotating the motor 50 on the left side toward the vehicle front side at a speed slower than that of the motor 50 on the right side is transmitted, and the electric mobility device travels forward while turning left at a speed in accordance with the amount of displacement of the operation lever 43b.

A setting unit 43c capable of performing various kinds of setting of the electric mobility device, such as maximum speed setting, operation mode setting, and lock setting of the electric mobility device is provided on the upper end of the control arm 43 on the left side. The setting unit 43c is provided with a plurality of operation buttons, a display unit, and the like. For example, exemplary operation modes include an energy saving operation mode in which electrical power consumption is reduced, a sport operation mode in which travel performance is prioritized instead of reducing electrical power consumption, and a normal operation mode between the energy saving operation mode and the sport operation mode. Examples of the lock setting of the electric mobility device include setting of a passcode for locking, and setting of a lock release timing. A setting signal from the setting unit 43c is transmitted to the control unit 60 described later, and setting of the electric mobility device is registered or changed at the control unit 60.

Figure 4:
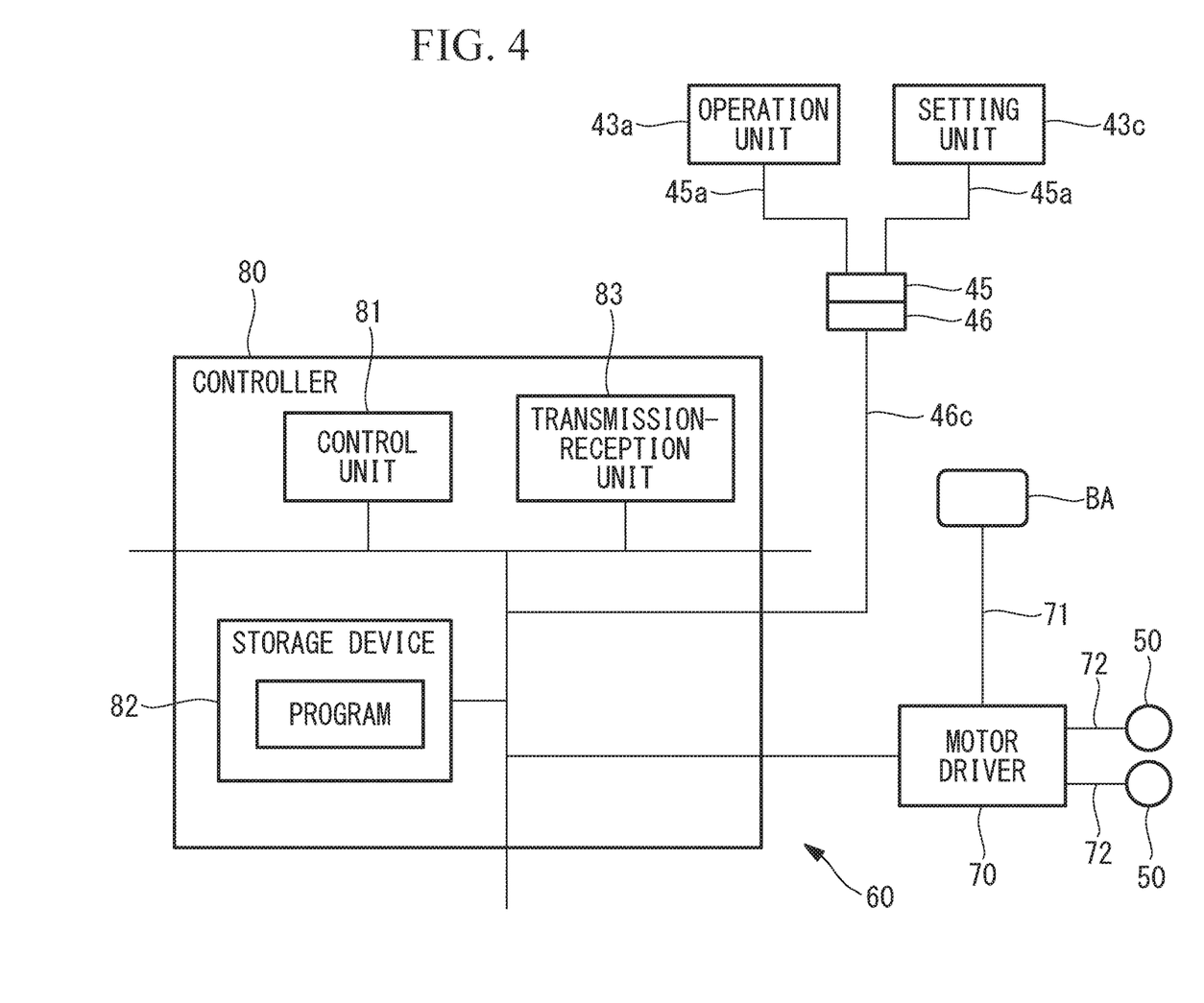
FIG. 4 is a block diagram illustrating a schematic configuration of a control unit of the electric mobility device according to the present embodiment.

As illustrated in FIG. 4, the control unit 60 includes a motor driver 70 configured to drive each motor 50, and a controller 80.

The motor driver 70 is connected with the battery BA through an electrical power line 71 and also connected with each motor 50 through an electrical power line 72, and drives each motor 50 through electric power supply.

The controller 80 includes a control unit 81 including a CPU, a RAM, and the like, a storage device 82 including a nonvolatile memory, a ROM, and the like, and a transmission-reception unit 83. The storage device 82 stores a computer program for controlling the electric mobility device. The control unit 81 operates based on the computer program, and transmits a drive signal for driving each motor 50 to the motor driver 70 based on signals from the operation unit 43a and the setting unit 43c.

The signals from the operation unit 43a and the setting unit 43c are transmitted to a first connector 45 through a signal line 45a, transmitted from the first connector 45 to a second connector 46, and transmitted from the second connector 46 to the controller 80 through a signal line 46c.

Figure 5:
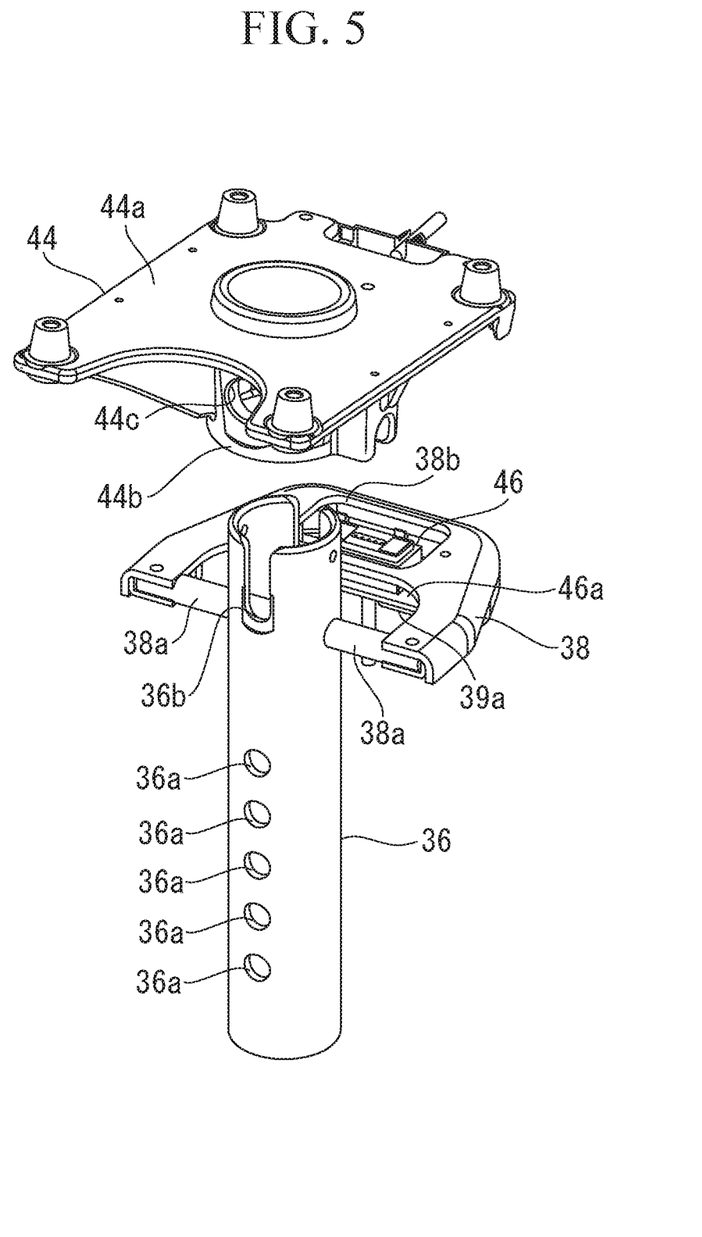
FIG. 5 is a main part perspective view illustrating a connection part of a seat unit and a mobility body of the electric mobility device according to the present embodiment.
Figure 6:
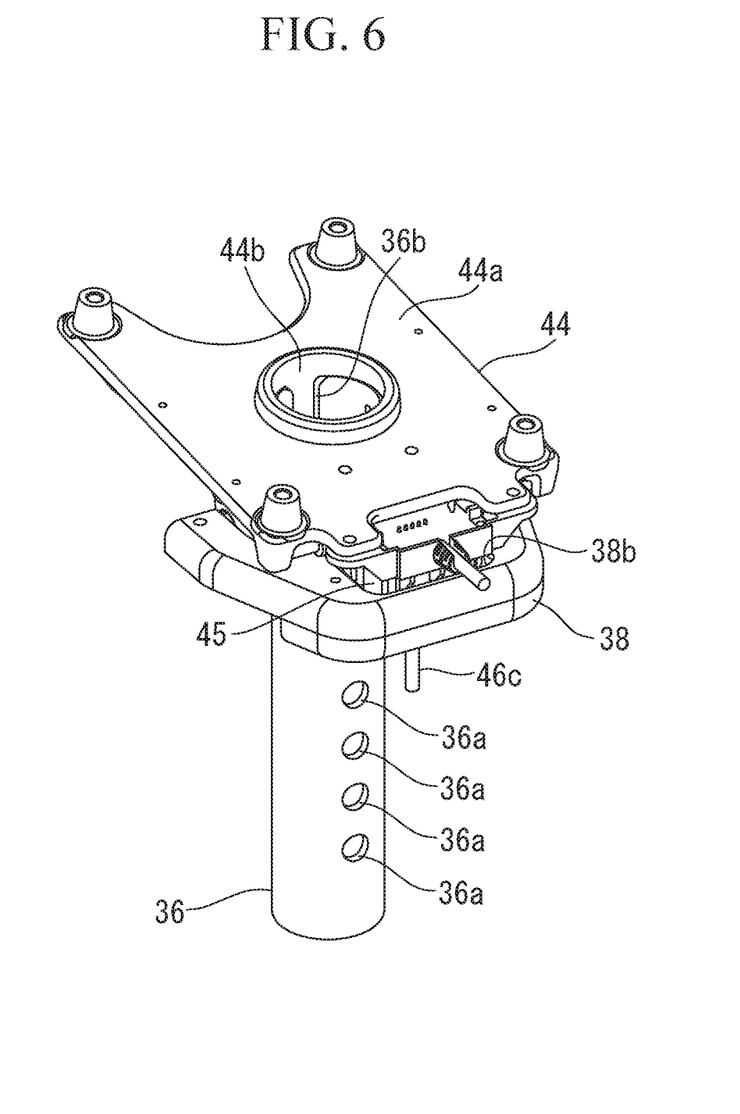
FIG. 6 is a main part perspective view illustrating the connection part of the seat unit and the mobility body of the electric mobility device according to the present embodiment.
Figure 7:
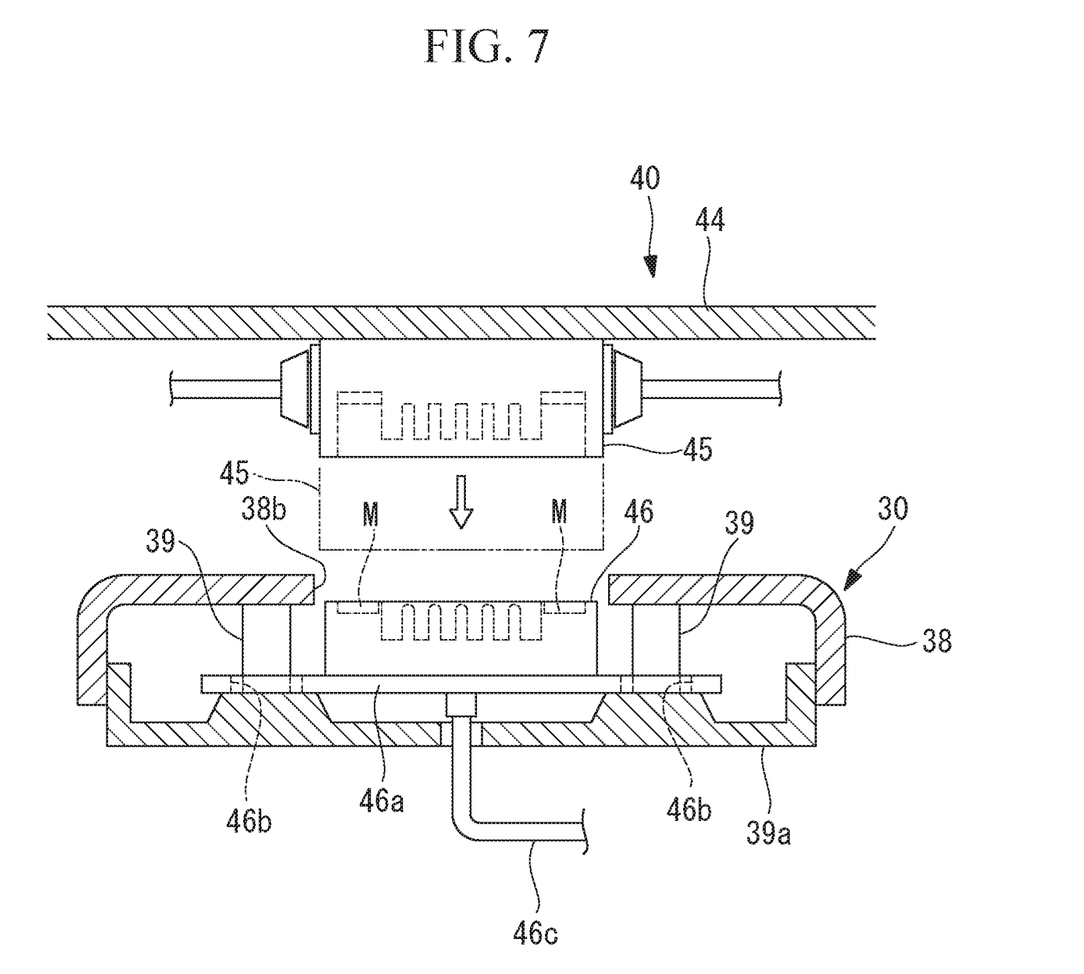
FIG. 7 is a cross-sectional view illustrating a connection structure of a first connector and a second connector of the electric mobility device according to the present embodiment.

As illustrated in FIGS. 5 to 7, the first connector 45 is fixed to the lower surface of the seating surface frame 44. The second connector 46 is supported by the seat attachment member 36 and movable in the up-down direction.

Specifically, a plate member 46a extending substantially in the horizontal direction is fixed to the second connector 46 and the plate member 46a is provided with a pair of through-holes 46b. A protection member 38 is fixed to the seat attachment member 36 through a pair of support shafts 38a extending substantially in the horizontal direction. In the present embodiment, the protection member 38 is formed by punching and pressing a steel plate. A pair of guide shafts 39 disposed at an interval in the horizontal direction are fixed to the lower surface of the protection member 38. The pair of guide shafts 39 are disposed at positions corresponding to the pair of through-holes 46b and extend in the up-down direction.

The guide shafts 39 are inserted into the pair of through-holes 46b of the plate member 46a, respectively, so that the second connector 46 is supported movably in the up-down direction along the pair of guide shafts 39. Accordingly, a guide mechanism including the pair of guide shafts 39 and the pair of through-holes 46b is provided. A fall-off prevention member 39a is fixed to the lower ends of the guide shafts 39 or the lower surface of the protection member 38, thereby preventing the second connector 46 from coming off from the guide shafts 39.

When the fall-off prevention member 39a is formed to cover substantially the entire lower surface of the second connector 46 as in the present embodiment, the fall-off prevention member 39a can prevent water, dust, and the like from entering into a connection part of the first connector 45 and the second connector 46. When the fall-off prevention member 39a is formed of, for example, a plastic material or a material having rubber elasticity, the fall-off prevention member 39a can reduce impact force at collision of an object from the lower side of the guide shafts 39 and the protection member 38, which are made of metal or the like.

A magnet M is attached to the upper surface of the second connector 46, and a magnet or a ferromagnetic member such as an iron piece is attached to a corresponding position of the first connector 45. When a magnet is attached to the first connector 45, a ferromagnetic member such as an iron piece may be attached in place of the magnet M.

In the electric mobility device described above, in order to attach the seat unit 40 to the mobility body 30, the seat unit 40 is disposed on the seat attachment member 36 so that the upper end side of the seat attachment member 36 is inserted into the tubular part 44b, and the attachment member 44d is attached to the tubular part 44b so that the attachment member 44d is inserted into the seat side hole 44c and the seat attachment hole 36b.

In this state, the second connector 46 is attached to the seat attachment member 36 through the guide mechanism so that the second connector 46 is disposed below the first connector 45.

In addition, as illustrated in FIG. 7, when the seat unit 40 is attached to the mobility body 30 and the second connector 46 is disposed at a position illustrated with double-dotted lines in FIG. 7 while the second connector 46 is disposed at a non-connection position (position illustrated in FIG. 7) at the lower end side of the guide mechanism, the second connector 46 is lifted upward along the guide mechanism by magnetic force of the magnet M, and accordingly moved to a position (connection position) where the second connector 46 is connected with the first connector 45. As the second connector 46 is attracted to the first connector 45 by the magnetic force, the second connector 46 and the first connector 45 are positioned to each other in the horizontal direction, and terminals of the second connector 46 and terminals of the first connector 45 are electrically connected with each other.

In this state, the height position of the seat unit 40 relative to the mobility body 30 can be adjusted by inserting the positioning member 37 into a different positioning hole 36a. In this case as well, since the second connector 46 is attached to the seat attachment member 36, the connection of the first connector 45 with the second connector 46 is maintained.

To detach the seat unit 40 from the mobility body 30, the attachment member 44d is removed from the tubular part 44b, and the seat unit 40 is lifted upward to remove the seat attachment member 36 from the tubular part 44b. Accordingly, the connection of the first connector 45 and the second connector 46, which is made only by the magnetic force, is released and the second connector 46 is moved to the non-connection position by gravitational force.

As described above, according to the present embodiment, the height position of the seat attachment member 36 relative to the mobility body 30 can be adjusted to adjust the height position of the seat unit 40, and the second connector 46 connected with the signal line 46c on the mobility body 30 side is attached to the seat attachment member 36. With this configuration, the position of the second connector 46 relative to the mobility body 30 in the up-down direction changes together with the seat attachment member 36.

The second connector 46 is attached to the seat attachment member 36 so that, when the seat unit 40 is attached to the seat attachment member 36, the second connector 46 is disposed below the first connector 45 where the connection with the first connector 45 is possible. With this configuration, it is possible to easily perform the connection of the first connector 45 and the second connector 46 even when the height of the seat attachment member 36 is changeable.

No magnet M may be provided, and the second connector 46 may be moved upward with a hand or the like and connected with the first connector 45 after the seat unit 40 is attached to the mobility body 30. In this case as well, since the second connector 46 is guided movably in the up-down direction, the first connector 45 and the second connector 46 can be easily connected with each other only by moving the second connector 46 upward.

Alternatively, no magnet M and no guide mechanism may be provided, and the second connector 46 may be attached to the seat attachment member 36 by using the signal line 46c or another flexible member so that the movable range of the second connector 46 is restricted to an area which is below the first connector 45 by the signal line 46*c* or the flexible member when the seat unit 40 is attached to the seat attachment member 36. In this case as well, since the second connector 46 is disposed below the first connector 45 when the seat unit 40 is attached to the seat attachment member 36, the first connector 45 and the second connector 46 can be easily connected with each other.

In the present embodiment, no work is necessary to move the first connector 45 upward toward the second connector 46 since the second connector 46 is moved upward along the guide mechanism and disposed at the connection position by magnetic force of the magnet M when the seat unit 40 is attached to the seat attachment member 36. In addition, since the first connector 45 and the second connector 46 are connected with each other by the magnetic force, the connection of the first connector 45 and the second connector 46 is released only by detaching the seat unit 40 from the mobility body 30.

In the present embodiment, the upper surface of the protection member 38 is disposed higher than the second connector 46 being disposed at the non-connection position, and the protection member 38 is provided with a hole 38*b* through which the second connector 46 and the first connector 45 are connected with each other. With this configuration, when the seat unit 40 is not attached to the seat attachment member 36 and the second connector 46 is disposed at the non-connection position, the second connector 46 is disposed in the hole 38*b* at a position lower than the upper surface of the protection member 38.

Accordingly, when the tubular part 44*b* of the seat unit 40 is wrongly moved in a direction in which collision with the second connector 46 would occur when the seat unit 40 is being attached to the seat attachment member 36, the collision can be prevented by the protection member 38. The same effect can be achieved when a cutout is provided in place of the hole 38*b*.

The second connector 46 is guided movably in the up-down direction by using the plurality of guide shafts 39 disposed at intervals in the horizontal direction and extending upward, and the plurality of through-holes 46*b* that are provided on the second connector 46 side and into which the plurality of guide shafts 39 are inserted, respectively. This leads to a simple configuration and easy maintenance of the mechanism with which the second connector 46 is guided movably in the up-down direction.

Since the plurality of guide shafts 39 are fixed to the lower surface of the protection member 38, substantially no change occurs to the positional relation between the protection member 38 and the second connector 46 at the non-connection position when the attachment position of the protection member 38 is slightly moved downward by the strong impact applied to the protection member 38 from an upper side. This configuration is advantageous for maintaining, for a long time, protection of the second connector 46 by the protection member 38.

In the present embodiment, the inner diameter of each through-hole 46*b* into which the corresponding guide shaft 39 is inserted is approximately 1.7 times larger than the outer diameter of the guide shaft 39. In other words, the area of the through-hole 46*b* in plan view is approximately three times larger than the cross-sectional area of the cross sectional area of the guide shaft 39 in the horizontal direction. With this configuration, the through-hole 46*b* is prevented as much as possible from being caught halfway through the guide shaft 39 in the up-down direction. Accordingly, the second connector 46 when not connected with the first connector 46 can be reliably disposed at a position where protection is provided by the protection member 38, and the second connector 46 can be more smoothly connected with the first connector 45. The inner diameter of the through-holes 46*b* is preferably 1.5 times or more larger than the outer diameter of the guide shafts 39.

The seat attachment member 36 is a shaft in the present embodiment, but may be a member in another shape or may be made of two or more components.

In a case, a wheelchair is directly used as a seat, and the wheelchair is mounted as a seat on the automobile after wheels are retracted. Thus, the wheelchair includes a motor used to retract the wheels, and the motor is driven by electrical power from the automobile side while the first connector and the second connector are connected with each other. However, a large-sized expensive device such as the elevation mechanism needs to be provided to the automobile to directly use the wheelchair as the seat of the automobile, and not all users can afford mounting of such a device on the automobile.

Recently, a vehicle such as a wheelchair tends to be regarded as a personal movement means, and electrification thereof is a normal option. Demand for such an electric mobility device has been increasing around the world. The electrification leads to weight increase by the weights of a motor, a battery, an operation unit, a control device, and the like, and makes it difficult to retract the wheels and directly use the wheelchair as a seat of an automobile.

Since the electric mobility device is significantly heavy, the electric mobility device is loaded onto an automobile or the like through movement on a slope provided between the floor surface of the automobile and the ground when the electric mobility device is to be transported onto the automobile. In this case, the automobile needs to have a space in accordance with the width and height of the electric mobility device, and in reality, a large automobile such as a commercially used baggage loading vehicle is needed.

Thus, it is preferable that the electric mobility device can be disassembled so that the electric mobility device can be loaded onto a small-sized or medium-sized passenger automobile. In addition, it is preferable that a relatively large seat unit can be removed from the mobility body so that the disassembled electric mobility device can be easily loaded onto the automobile.

The mobility body is provided with a motor, and the seat unit is provided with an operation unit used to operate the motor. In this configuration, a communication line on the mobility body side and a communication line on the seat unit side need to be detachable.

Specifically, a first connector and a second connector are provided. The first connector is connected with the communication line on the mobility side. The second connector is connected with the communication line on the seat unit side and connected with the first connector. Connection of the communication line on the mobility side with the communication line on the seat unit side is made through the connection of the first connector and the second connector. Since the second connector needs to be connected with the first connector when the seat unit is mounted onto the mobility body, it is preferable to configure in such a way that the connection and releasing of the connectors can be done easily.

The height position of the seat unit relative to the mobility body needs to be changed in accordance with the height of a passenger or the like. Thus, for example, the mobility body is provided with a seat height adjustment mechanism that adjusts the height position of the seat unit by changing the height position of a seat attachment unit of the mobility body. With this configuration, it is preferable to configure in such a way that the connection of the second connector and the first connector can be done easily all the time even when the height position of the seat attachment unit is changed by the seat height adjustment mechanism.

The present embodiment is intended to make an improvement in the above-described circumstances and provide a connector structure with which it is possible to easily perform the connection of a connector on a mobility body side and a connector on a seat unit side even when the height position of a seat attachment unit of a mobility body is changeable.

The following aspects of the present invention are derived from the above disclosure.

A first aspect of the present invention is a connector structure in an electric mobility device including: a mobility body provided with a plurality of wheels and a motor to drive at least one of the plurality of wheels; a seat unit detachably attached to a seat attachment member of the mobility body and provided with an operation unit to control driving of the motor; and a seat height adjustment mechanism which adjusts a height position of the seat attachment member relative to the mobility body, wherein the connector structure is for connecting a signal line of the mobility body to a signal line which is provided in the seat unit and which is connected to the operation unit, the connector structure comprising: a first connector attached to the seat unit and connected to the signal line which is connected to the operation unit; and a second connector attached to the seat attachment member and connected to the signal line of the mobility body, wherein the second connector is attached to the seat attachment member such that, when the seat unit is attached to the seat attachment member, the second connector is positioned below the first connector where the second connector can be connected with the first connector.

In this aspect, the height position of the seat attachment member relative to the mobility body is adjusted in order to adjust the height position of the seat unit, and the second connector connected to the signal line of the mobility body is attached to the seat attachment member. With this configuration, the position of the second connector relative to the mobility body in the up-down direction changes together with the seat attachment member.

In addition, the second connector is attached to the seat attachment member such that, when the seat unit is attached to the seat attachment member, the second connector is positioned below the first connector where the connection with the first connector is possible. With this configuration, it is possible to easily perform the connection of the first connector with the second connector even when the height of the seat attachment member is changeable.

In the above-described aspect, the mobility body may be provided with a control unit which controls the motor based on a signal from the operation unit, and the signal from the operation unit may be transferred to the control unit through the signal line connected to the operation unit and the signal line on the mobility body side.

In the above-described aspect, it is preferable that: the second connector is attached to the seat attachment member through a guide mechanism configured to guide the second connector movably in an up-down direction; and the second connector is guided by the guide mechanism such that the second connector can move to a connection position where the second connector is connected with the first connector in a state in which the seat unit is attached to the seat attachment member, and that the second connector can move to a non-connection position that is lower than the connection position and where the second connector is not connected with the first connector.

With this configuration, the second connector is connected with the first connector when the second connector is moved upward along the guide mechanism after the seat unit is attached to the seat attachment member. Thus, this configuration is advantageous for implementing easy and reliable connection of the second connector with the first connector.

In the above-described aspect, it is preferable that a magnet is provided in at least one of the first connector and the second connector, and the second connector is moved upward along the guide mechanism by magnetic force of the magnet and positioned at the connection position when the seat unit is attached to the seat attachment member.

With this configuration, the second connector is connected with the first connector by magnetic force when the seat unit is attached to the seat attachment member, and thus the connection requires reduced work or no work.

In the above-described aspect, it is preferable that the seat attachment member is provided with a protection member protecting the second connector, and an upper surface of the protection member is positioned higher than the second connector being disposed at the non-connection position by the guide mechanism and the protection member has a hole or a cutout through which the second connector being disposed at the connection position by the guide mechanism is connected with the first connector.

In this configuration, the upper surface of the protection member is positioned higher than the second connector at the non-connection position, and the second connector is connectable with the first connector through the hole or cutout. Thus, when the second connector is positioned at the non-connection position and not connected with the first connector, no object contacts the second connector from the upper side of the protection member unless the object passes through the hole or cutout. Accordingly, part of the seat unit is unlikely to hit the second connector from the upper side when the seat unit is being attached to the seat attachment member.

In the above-described aspect, the guide mechanism may include a plurality of guide shafts disposed at intervals in a horizontal direction and extending in the up-down direction, and the second connector or a member fixed to the second connector may be provided with a plurality of through-holes into which the plurality of guide shafts are inserted respectively such that the second connector is guided movably in the up-down direction by the plurality of guide shafts and the plurality of through-holes. This simple structure allows easy maintenance of the guide mechanism.

In the above-described aspect, it is preferable that the area of each through-hole in plan view is 1.5 times or more larger than a cross-sectional area of a cross section in the horizontal direction of the corresponding guide shaft.

In a case in which substantially no gap is provided between the outer peripheral surface of each guide shaft and the inner peripheral surface of the corresponding through-hole, the through-hole is likely to be caught at the guide shaft when the second connector is tilted and the height position of a through-hole is different from that of another through-hole. However, with the above-described configuration, a large gap is provided between the outer peripheral surface of each guide shaft and the inner peripheral surface of the corresponding through-hole. Accordingly, the second connector smoothly moves in the up-down direction even when the height position of a through-hole is different from that of another through-hole.

According to the above aspects, it is possible to easily perform the connection of a connector on a mobility body side with a connector on a seat unit side even when the height of a seat attachment unit of a mobility body is changeable.

REFERENCE SIGNS LIST 10 front wheel
20 rear wheel
30 mobility body
31 body
33 seat support part
34 support part frame
36 seat attachment member
36a positioning hole
36b seat attachment slit
37 positioning member
38 protection member
38a support shaft
38b hole
39 guide shaft
39a fall-off prevention member
40 seat unit
41 seating surface part
42 backrest part
43 control arm
43a operation unit
43c setting unit
44 seating surface frame
44b tubular part
44c seat side hole
44d attachment member
45 first connector
46 second connector
46a plate member
46b through-hole
BA battery
M magnet

What is claimed is:

1. A connector structure in an electric mobility device including: a mobility body provided with a plurality of wheels and a motor to drive at least one of the plurality of wheels; a seat unit detachably attached to a seat attachment member of the mobility body and provided with an operation unit to control driving of the motor; and a seat height adjustment mechanism which adjusts a height position of the seat attachment member relative to the mobility body, wherein the connector structure is for connecting a second signal line of the mobility body to a first signal line which is provided in the seat unit and which is connected to the operation unit, the connector structure comprising:
   a first connector fixed to the seat unit and connected to the first signal line; and
   a second connector which is attached to the seat attachment member so that the second connector exists outside the seat attachment member and which is connected to the second signal line,
   wherein the second connector is attached to the seat attachment member such that, when the seat unit is attached to the seat attachment member, the second connector is positioned below the first connector where the second connector can be connected with the first connector.

2. The connector structure according to claim 1, wherein the mobility body is provided with a control unit which controls the motor based on a signal from the operation unit, and
the signal from the operation unit is transmitted to the control unit through first and second signal lines connected together via the first and second connectors.

3. The connector structure according to claim 1, wherein the second connector is attached to the seat attachment member through a guide mechanism which guides the second connector movably in an up-down direction, and
the second connector is guided by the guide mechanism such that the second connector can move to a connection position where the second connector is connected with the first connector in a state in which the seat unit is attached to the seat attachment member, and that the second connector can move to a non-connection position which is lower than the connection position and where the second connector is not connected with the first connector.

4. The connector structure according to claim 3, wherein a magnet is provided in at least one of the first connector and the second connector, and the second connector is moved upward along the guide mechanism by magnetic force of the magnet and positioned at the connection position when the seat unit is attached to the seat attachment member.

5. The connector structure according to claim 3, wherein the seat attachment member is provided with a protection member protecting the second connector, and
an upper surface of the protection member is positioned higher than the second connector being disposed at the non-connection position by the guide mechanism and the protection member has a hole or a cutout through which the second connector being disposed at the connection position by the guide mechanism is connected with the first connector.

6. The connector structure according to claim 3, wherein the guide mechanism includes a plurality of guide shafts disposed at intervals in a horizontal direction and extending in the up-down direction, and
the second connector or a member fixed to the second connector is provided with a plurality of through-holes into which the plurality of guide shafts are inserted, respectively, such that the second connector is guided movably in the up-down direction by the plurality of guide shafts and the plurality of through-holes.

7. The connector structure according to claim 6, wherein the area of each through-hole in plan view is 1.5 times or more larger than a cross-sectional area of a cross section in the horizontal direction of the corresponding guide shaft.

8. A connector structure in an electric mobility including: a mobility body provided with a plurality of wheels and a motor to drive at least one of the plurality of wheels; a seat unit detachably attached to a seat attachment member of the mobility body and provided with an operation unit to control driving of the motor; and a seat height adjustment mechanism which adjusts a height position of the seat attachment member relative to the mobility body, wherein the connector structure is for connecting a first signal line of the mobility body to a second signal line which is provided in the seat unit and which is connected to the operation unit, the connector structure comprising:
   a first connector which is positioned at a seat unit side relative to the seat attachment member and which is attached to the seat unit and connected to the first signal line; and a second connector which is attached to the seat attachment member so that the second connector exists outside the seat attachment member and which is connected to the second signal line, wherein the second connector is attached to the seat attachment member such that, when the seat unit is attached to the seat attachment member, the second connector is positioned below the first connector where the second connector can be connected with the first connector.

9. A connector structure in an electric mobility including: a mobility body provided with a plurality of wheels and a motor to drive at least one of the plurality of wheels; a seat unit detachably attached to a seat attachment member of the mobility body and provided with an operation unit to control driving of the motor; and a seat height adjustment mechanism which adjusts a height position of the seat attachment member relative to the mobility body, wherein the connector structure is for connecting a first signal line of the mobility body to a second signal line which is provided in the seat unit and which is connected to the operation unit, the connector structure comprising:

a first connector fixed to the seat unit and connected to the first signal line;

a guide fixed to the seat attachment member; and a second connector which is supported by the guide so as to be movable in an up-down direction relative to the seat attachment member and which is connected to the second signal line, wherein the second connector is attached to the seat attachment member such that, when the seat unit is attached to the seat attachment member, the second connector is positioned below the first connector where the second connector can be connected with the first connector.

* * * * *